Sept. 5, 1961 C. LENZ 2,998,687
PACKAGING APPARATUS
Filed Oct. 15, 1958 3 Sheets-Sheet 1
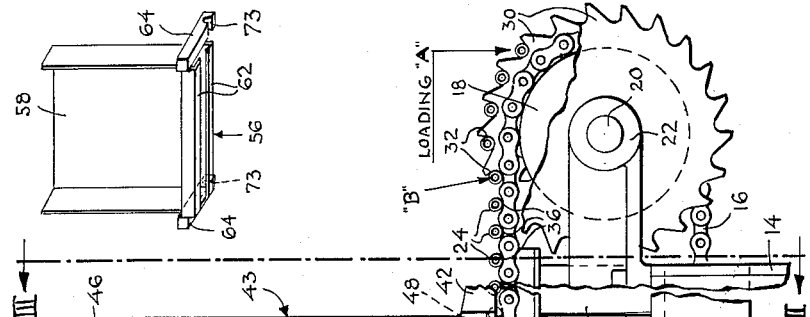
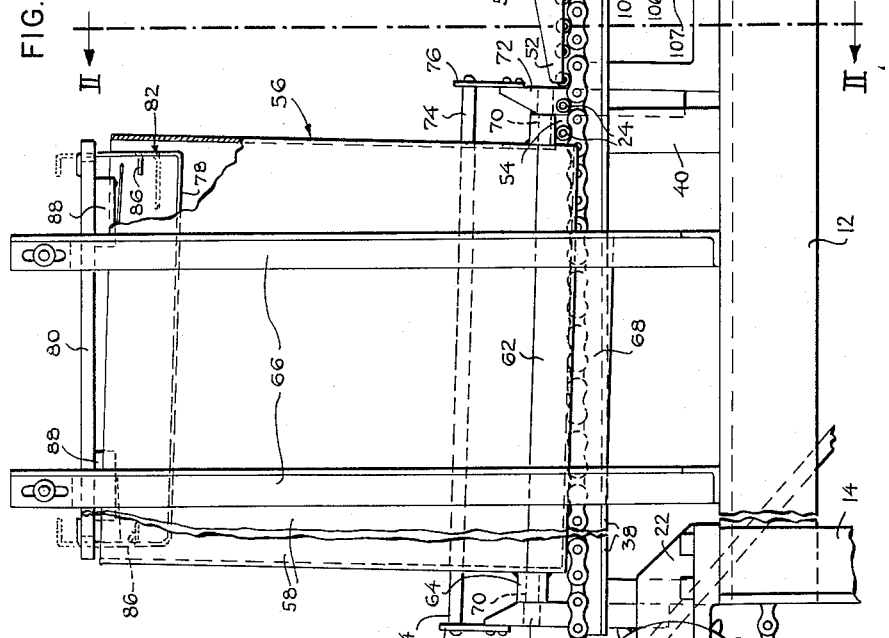
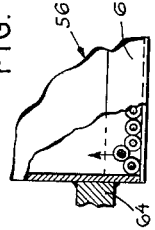
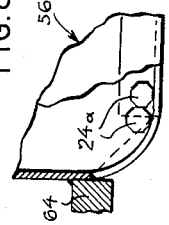
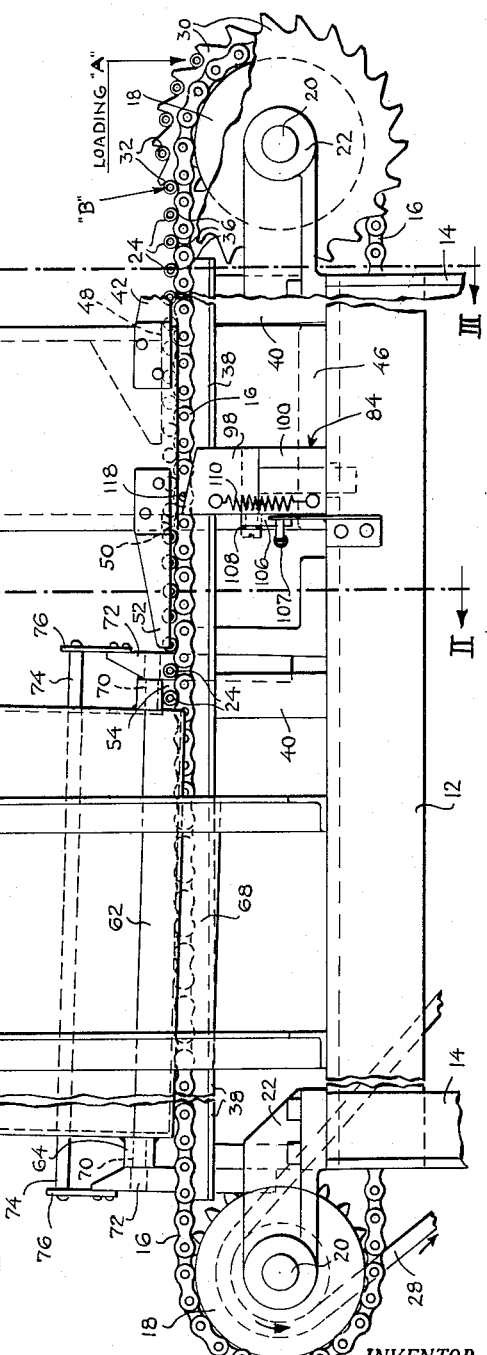
INVENTOR.
CARL LENZ
BY
ATTORNEY.

Sept. 5, 1961     C. LENZ     2,998,687
PACKAGING APPARATUS
Filed Oct. 15, 1958     3 Sheets-Sheet 2
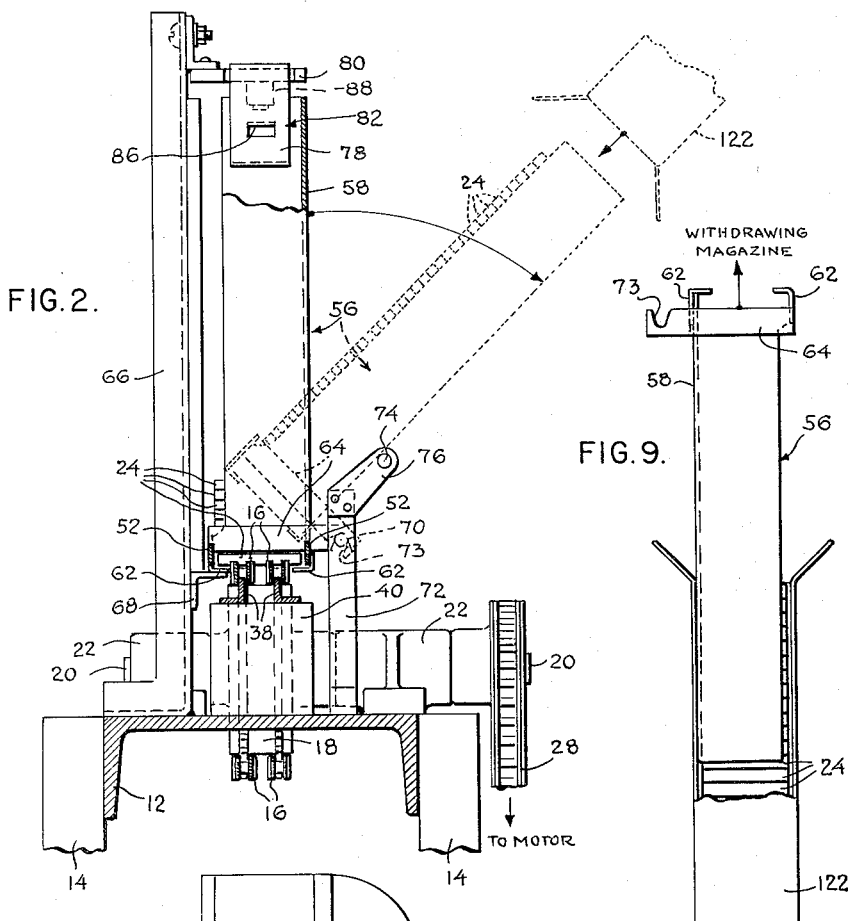
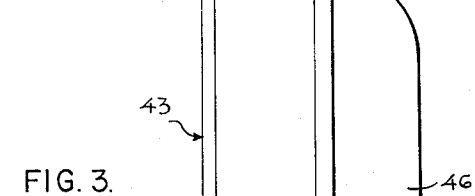
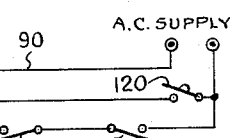
INVENTOR.
CARL LENZ.
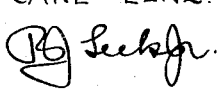
ATTORNEY.

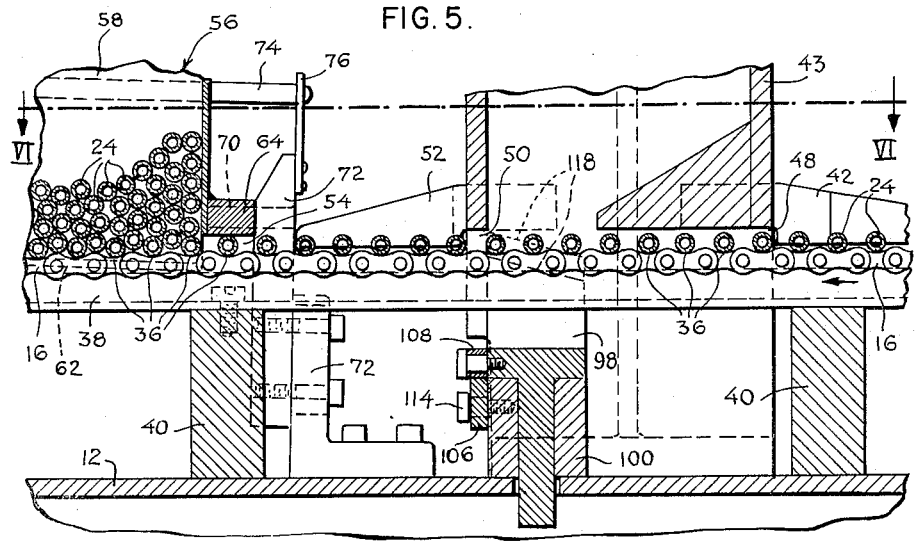
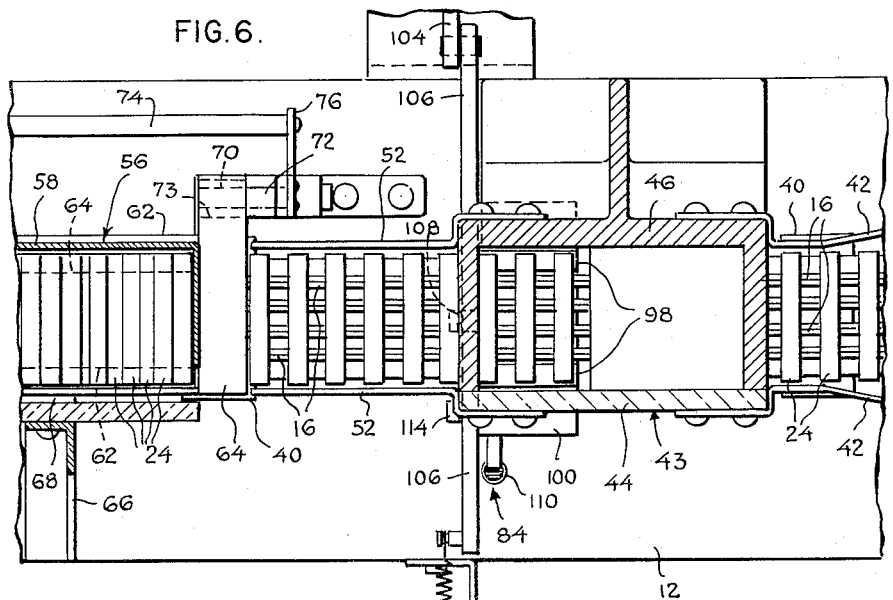
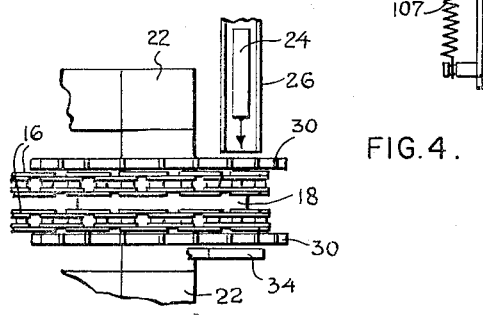

United States Patent Office 2,998,687
Patented Sept. 5, 1961

2,998,687
PACKAGING APPARATUS
Carl Lenz, Packanack Lake, N.J., assignor to Westinghouse Electric Corporation, East Pittsburgh, Pa., a corporation of Pennsylvania
Filed Oct. 15, 1958, Ser. No. 767,454
10 Claims. (Cl. 53—236)

The present invention relates to packaging apparatus and, more particularly, to apparatus for automatically packaging cylindrical articles, such as vitreous tubing, or multi-sided articles, such as hexagonal rods or the like, into open containers.

Heretofore, in the manufacture of vitreous tubing for use as exhaust tubulations for the envelopes of incandescent and fluorescent lamps and the like, the vitreous tubing is drawn and cut in relatively long lengths by apparatus of the type shown in U.S. Patent No. 2,721,317, issued October 18, 1955, to L. R. O'Neil. The relatively long lengths of vitreous tubing are then fed to a glass-cutting machine of the type shown in U.S. Patent No. 1,754,143, issued April 8, 1930, to C. A. Brown et al., where it is cut to the desired predetermined length and fed at a rate of about 50,000 pieces per hour to a conveyor adapted to receive the pieces of tubing with their longitudinal axes aligned in one direction. This conveyor is operable to move such pieces of tubing (in a direction transverse to the longitudinal axes of the pieces of tubing) along a stationary guide, which aligns all pieces in the same relative position on the conveyor. Such conveyor also moves the tubing through a series of end glazing fires and thence to a packaging station where heretofore the glazed pieces of tubing have been packed by hand in a relatively large container in desired numbers, such as five hundred in one container. This manual packaging of the pieces of tubing is expensive, tedious and subject to human error.

I am aware of automatic packaging apparatus of the top-loading type such, for example, as that shown in U.S. Patent No. 2,826,883, issued March 18, 1958, to M. Pollmann. Apparatus of this type utilizes complicated feeding devices and gravity to feed the aligned cylindrical articles, such as cigarettes, into an open container carried on a moving conveyor. Such apparatus is complicated in structure and in operation and is expensive to build and maintain. In addition, the speed of the conveyor on which the containers are carried is dependent on the rate of feeding of the cigarettes to the packaging apparatus and must be adjusted in accordance therewith. Further, owing to the relatively hard brittle nature of vitreous tubing, a strong possibility exists that pieces of tubing would become jammed in the feeding mechanism of the packaging apparatus (as disclosed in this patent) all of which renders it unsuitable for the packaging of vitreous tubing.

It is the general object of the present invention to avoid and overcome the foregoing and other difficulties of and objections to prior art practices by the provision of automatic apparatus of the bottom-loading type for filling containers with cylindrical or multi-sided articles.

A specific object of the present invention is the provision of apparatus for packaging cylindrical or multi-sided articles which apparatus is independent in its operation on the rate at which articles are fed to it.

Another object is the provision of packaging apparatus for automatically filling a container with large quantities of cylindrical or multi-sided articles at heretofore unknown high rates of production, thereby eliminating the expensive and tedious manual packaging operation.

A further object is the provision of automatic packaging apparatus which is adapted to accept a steady flow of cylindrical or multi-sided articles without interruption in the operation of such packaging apparatus.

An additional object is the provision of automatic packaging apparatus which is simple in structure and operation and is inexpensive in cost and maintenance.

The aforesaid objects of the invention and other objects which will become apparent as the description proceeds, are achieved by providing an article-supporting member operable to receive cylindrical or multi-sided articles, a container disposed above the article-supporting member, which container is adapted to admit the article-supporting member and the cylindrical articles carried thereby and is further adapted to amass such cylindrical articles therein while permitting the egress of the article-supporting member therefrom, and means for causing relative movement between said container and said article-supporting member.

For a better understanding of the invention reference should be had to the accompanying drawings, wherein like numerals of reference indicate similar parts throughout the several views, and wherein:

FIG. 1 is a front-elevational view of the packaging apparatus of the present invention showing a movable article-supporting member, a storing means, operating means for retaining the articles within the storing means, a container or magazine, and control means for actuating the operating means when the magazine is filled;

FIG. 2 is an end-elevational view, partially in section, taken along the line II—II of FIG. 1 in the direction of the arrows and showing the magazine, movable member and a portion of the control means;

FIG. 3 is a view similar to FIG. 2 along the line III—III of FIG. 1 in the direction of the arrows and showing the movable member, storing means, the operating means and schematically the control means;

FIG. 4 is a fragmentary plan view of the loading end of the movable member and an associated article-feeding means;

FIG. 5 is a fragmentary enlarged vertical-sectional view of the movable member and magazine, storing means and a portion of the operating means and showing the article-packaging operation after it has been partially completed;

FIG. 6 is a horizontal-sectional view taken along the line VI—VI of FIG. 5 in the direction of the arrows;

FIG. 7 is a fragmentary enlarged vertical-sectional view of a left-hand portion of the magazine, as viewed in FIG. 1, and showing the position of the articles within the magazine after the first layer has been introduced therein preparatory for the formation of the subsequent layers thereon;

FIG. 8 is a view similar to FIG. 7 showing an alternative embodiment of the magazine when multi-sided articles are fed therein;

FIG. 9 is a side-elevational view of a shipping container and the magazine after the articles have been deposited in the shipping container and showing the magazine during a stage of its withdrawal;

FIG. 10 is a perspective view of the preferred embodiment of the magazine.

Although the principles of the present invention are broadly applicable to the packaging of cylindrical articles, such as tubing or multi-sided articles, such as hexagonal rods and the like, into open containers, the invention is particularly adapted for use in conjunction with the packaging of vitreous tubing into an open container and hence it has been so illustrated and will be so described.

With specific reference to the form of the invention illustrated in the drawings, and referring particularly to FIGS. 1 and 2, a frame for the packaging apparatus of the present invention is provided, which comprises a table 12 supported on legs 14.

To provide mounting means on the frame for a movable article-supporting member, such as the endless chains 16, extending around and supported by guide members, such as the double sprockets 18, such sprockets 18 are mounted on shafts 20 suitably journalled in brackets 22 secured to the table 12. These endless chains 16 are adapted to receive cylindrical articles, such as pieces of vitreous tubing 24, with their longitudinal axes aligned in one direction from a feeding means, suitably a gravity-type feeding chute 26 (FIG. 4), as hereinafter explained in detail. Such endless chains 16 are operable to move the pieces of tubing 24 in a direction transverse to the longitudinal axes of such tubing 24 positioned thereon, namely from right to left, as viewed in FIG. 1. In order to drive the endles chains 16 in the above-mentioned direction, the left-hand shaft 20, as viewed in FIG. 1, is connected by a chain drive 28 (FIGS. 1 and 2) to a motor (not shown).

The means utilized to transfer the tubing 24 from the gravity-type feeding chute 26 to the endless chains 16 comprises a pair of serrated loading wheels 30 (FIG. 4) mounted on the right-hand shaft 20, as viewed in FIG. 1, on either side of the right-hand double sprocket 18. After a piece of tubing 24 moves down the feeding chute 26, it slides across registering spaces between adjacent serrations or teeth 32 in the continuously rotating loading wheels 30 at the loading point "A," and the forward movement of such tubing is arrested by a stationary stop 34 mounted on the bracket 22. The piece of tubing 24 is carried between the registering serrations 32 during the counterclockwise movement of the loading wheels 30, as viewed in FIG. 1, from point "A" to the point "B" where such tubing 24 is deposited by the loading wheels 32 in registering tubing-receiving grooves 36 provided in the side links of the endless chains 16.

As shown in FIGS. 1 and 2, the upper tubing-supporting portions of the endless chains 16 are supported and guided in their longitudinal path of movement between the double sprockets 18 by angles 38 mounted on blocks 40 secured to the table 12.

After a piece of tubing 24 has been deposited in registering tubing-receiving grooves 36, such piece of tubing 24 is aligned by one of a pair of stationary guides 42 (FIGS. 1, 3, 5 and 6) disposed on opposite sides of the path of movement of the endless chains 16. These stationary guides 42 are mounted on a storing means 43 (FIGS. 1, 3, 5 and 6).

Storing means

This storing means 43 is suitably a single casting comprising a windowed box 44 disposed above the endless chains 16 and a bracket 46 upstanding from the table 12. Such storing means is adapted by means of an entrance 48, to admit the endless chains 16 and a piece of tubing 24 carried thereby and to normally permit egress of the endless chains and the piece of tubing through an exit 50, provided in the opposite side wall of the storing means. The stationary guides 42 align the piece of tubing 24 on the endless chains 16 in a predetermined position thereon to permit the piece of tubing 24 to normally pass through the entrance 48 (FIG. 1), into the interior of the windowed box 44 and to continue uninterrupted through the exit 50. However, under certain conditions, as hereinafter explained, the passage of the tubing 24 through the storing means 43 is interrupted with such tubing 24 being temporarily stored therein. Additional stationary guides 52 (FIGS. 1, 5 and 6) secured to the storing means 43 and disposed along the further path of movement of the endless chains 16 guide the aligned piece of tubing 24 through an entrance 54 in a removable container or magazine 56 (FIGS. 1, 2, 5 and 6).

Magazine

Such magazine 56 is disposed above the endless chains 16 (while in its normal tubing-receiving position shown in FIG. 1) and along its path of movement. The magazine 56 is operable to admit the endless chains and a piece of tubing 24 carried thereby through the entrance 54 and to retain the piece of tubing therein while permitting the egress of the endless chains 16 therefrom through an exit 57.

Such magazine 56 comprises essentially a U-shaped body 58 (FIG. 10) provided with a pair of longitudinally disposed angles 62 (adapted, as hereinafter explained, to receive the pieces of tubing 24 as they are rolled upwardly thereon and out of the tubing-receiving grooves 36 in the endless chains 16) and with bottom legs 64 secured to the body 58 transverse to the angles 62.

The magazine 56 is supported while the latter is in the tubing-receiving position, shown in FIG. 1 and in the solid-line position of FIG. 2, by suitable means such as a pair of upright supports 66 mounted on the table 12 and on which is affixed a support 68 for the left-hand angle 62, as viewed in FIG. 2, while the magazine 56 is in the tubing-receiving position. This support 68 is inclined upwardly (FIG. 1) in the direction of movement of the endless chains 16. As shown in FIG. 2 the right-hand portion of the magazine 56 is supported by pins 70 projecting inwardly from brackets 72 upstanding from the table 12 adjacent the entrance 54 and exit 57 to the magazine 56, which pins 70 are received in grooves 73 provided in the bottom legs 64. As shown in FIG. 1, the coincident axes of the pins 70 are inclined to the horizontal at the same angle as the support 68 thereby canting the magazine 56 at the same angle when it is at rest in its normal tubing-receiving position upon the pins 70 and the support 68.

In order to place an empty magazine 56 in the tubing-receiving position shown in FIG. 1 and the solid-line position shown in FIG. 2, the empty magazine 56 is manually inclined in a position similar to the dotted-line position shown in FIG. 2, and slid downwardly along a rest, suitably an inclined rod 74, FIGS. 1, 2, 5 and 6 (mounted by means of brackets 76 on the brackets 62) until the pins 70 are received in the grooves 73 in the bottom legs 64, and the magazine 56 has reached the dotted-line position in FIG. 2. The empty magazine 56 is then rotated in counterclockise direction from such dotted-line position, shown in FIG. 2, to the solid-line position shown in such figure until the lefthand angle 62 on the empty magazine comes to rest on the support 68, thereby placing such empty magazine in its normal tubing-receiving position.

As hereinbefore mentioned during normal operation of the packing apparatus a piece of tubing 24 leaves the exit 50 of the storing means 43 and while it is maintained in its predetermined position on the endless chains 16 by the stationary guides 52 it is carried toward the magazine 56. It will be understood from a consideration of FIGS. 1 and 5 that the right-hand bottom leg 64 of the magazine 56 is disposed above the endless chains 16 a distance adapted to permit a piece of tubing 24 carried in the grooves 36 to pass through the entrance 54 to the magazine 56 formed by such disposition of the right-hand bottom leg 64 with respect to the endless chains 16. Once such a piece of tubing 24 enters the entrance 54, it is prevented from backing out therefrom since the distance from the underside of the right-hand bottom leg 64 to the raised hub portions of the links of the endless chains 16 is less than the diameter of the piece of tubing. It is preferable that such underside of the leg 64 be disposed parallel to the endless chains 16 (FIG. 5) to prevent jamming of or backing out of the pieces of tubing 24 from the entrance 54. The endless chains 16 thereafter carry the piece of tubing to the left when viewed in FIGS. 1, 5 and 6, through the entrance 54 and into the interior of the magazine where the piece of tubing 24 engages the inclined angles 62 and is lifted thereby from the tubing-receiving grooves 36 on the endless chains 16. The force exerted by the succeeding pieces of tubing 24 carried into the magazine 56 by the endless chains 16 causes the leading piece of tubing to roll upwardly on the inclined angles 62 until a first layer of the pieces of tubing 24 has been formed thereon, as shown in FIG. 7

Thereafter during the continued movement of the endless chains through the magazine 56, the alternate engagement of the raised hub portions and grooves 36 of the links of the endless chains 16 with the first layer of pieces of tubing 24, causes such pieces to reciprocate thereby maintaining such layer in a rolling fluid state. The continued lateral force exerted by succeeding pieces of tubing entering the magazine 56 is effective to cause a piece of tubing in the rolling fluid first layer, such as the piece of tubing 24 indicated by the arrow in FIG. 7 to rise upwardly out of the first layer to start a second layer. Thereafter as the process is repeated and succeeding layers of the rolling pieces of tubing are formed as shown in FIG. 5, the fluid mass of pieces of tubing ultimately fills the magazine 56, while keeping said mass within the open-faced magazine with the longitudinal axes of the pieces of tubing aligned in one direction.

As the mass of pieces of tubing 24 approach the top of the magazine 56, as viewed in FIGS. 1 and 2, the upper pieces of tubing come into engagement with a control member 78 slidably mounted in a plate 80 affixed to the supports 66. This control member 78 forms a part of a control means 82 (FIGS. 1, 2 and 3) which is operable (when the magazine 56 is filled with pieces of tubing 24) to actuate an operating means 84 (FIGS. 1, 3, 5 and 6) thereby interrupting the flow of pieces of tubing to the filled magazine 56 with attendant temporary storage thereof in the storage means 43, to permit the removal of such filled magazine 56 and the continued uninterrupted operation of the packaging apparatus of the present invention.

Control means

As shown in FIGS. 1 and 2, the control member 78 is provided with fingers 86 which are operable when the mass of pieces of tubing 24 move the control member 78 upwardly, as viewed in FIG. 1, to close a pair of normally-open switches 88 affixed to the plate 80. When, and only when, both switches 88 are closed, an "operating" circuit is automatically closed. Such "operating" circuit extends from one side of a suitable voltage supply, indicated by the legend "A. C. Supply" (FIG. 3), through conductor 90 to a coil of a solenoid 92 (associated with the operating means 84) and thence through a conductor 94 through the switches 88 to the other side of the voltage supply.

To provide visual indication that the "operating" circuit is closed, a signal light 96 (FIG. 3) is connected by suitable conductors in parallel with the "operating" circuit.

As hereinbefore pointed out, energization of the coil of the solenoid 92 actuates the operating means 84 to cause the retention of the pieces of tubing 24 within the storing means 43 while permitting the egress of the endless chains 16 therefrom.

Operating means

As shown in FIGS. 1, 3, 5 and 6, the operating means 84 has an operating plate 98 which is vertically reciprocable in a block 100 mounted on the table 12.

To provide means for causing the vertical movement of the operating plate 98 into the windowed box 44 upon energization of the coil of the solenoid 92, an armature 102 of such solenoid 92 is connected by a link 104 to a cam plate 106 horizontally reciprocable on the block 100 (against the action of a spring 107) and a roller 108 on the operating plate 98 is biased by a spring 110 to engage a cam surface 112 on the cam plate 106. So that cam plate 106 is retained on the block 100 during its reciprocation, the cam plate 106 is keyed to the block 100 by means of pins 114 projecting from the block 100 into suitable slots provided in the cam plate 106.

Upon energization of the coil of the solenoid 92 by closure of the "operating" circuit, the armature 102 and the attached cam plate 106 are moved to the right, as viewed in FIG. 3, against the action of the spring 107 to cause the roller 108 to ride upwardly on the cam surface 112 with attendant upward movement of the operating plate 98 against the action of the spring 110. This upward movement of the operating plate 98 causes its upper surface 118 (which surface is upwardly inclined in the direction of movement of the endless chains 16) to be projected through suitable slots in the bottom of the windowed box 44 of the storing means 43. This insertion of the inclined surfaces 118 into the windowed box 44 shuts off exit 50 from such windowed box 44 and permits the pieces of tubing 24 carried in the grooves 36 in the endless chains 16 to ride upwardly thereon, with resultant removal of such pieces of tubing from the chain grooves 36 and the formation, as hereinbefore related with respect to the filling of the magazine 56, of successive layers of pieces of tubing 24 within the windowed box 44.

After the flow of the pieces of tubing 24 to the now filled magazine 56 has been shut off by the above-described automatic operation of the control means 82 and the operating means 84 (as indicated by the lighting of the signal lamp 96), the operator manually closes a knife switch 120 (FIG. 3) which is connected by suitable conductors in parallel with the switches 88 as a holding shunt to permit the manual removal of the filled magazine as now described. It will be understood that during the magazine removal operation the continued movement of the endless chains 16 causes the pieces of tubing 24 to accumulate in the storing means 43.

In order to remove the now-filled magazine 56, the operator rotates such magazine clockwise, as viewed in FIG. 2, one the pins 70, from the solid-line position to the dotted-line position shown therein, until the filled magazine rests against the rod 74. The operator then slides a shipping container 122 (FIG. 2) down over the filled magazine 56 and moves both the shipping container 122 and the magazine 56 away from the pins to permit the bottom of the shipping container 122 to seat on the top of the magazine 56. Thereafter the shipping container 122 and the filled magazine 56 substantially contained therein are inverted and are placed with the closed end of the shipping container 122 down on a suitable table 124, shown in FIG. 9. The magazine 56 is then withdrawn, as indicated in FIG. 9, leaving the pieces of tubing 24 in the shipping container 122, which is then sealed and sent to a storage location, such as a warehouse.

The operator then returns the now-empty magazine 56 to the loading position (solid-line position of FIG. 2) and opens the switch 120 which opens the "operating" circuit with resultant retraction of the operating plate 98 and resumption of the delivery of the pieces of tubing to the magazine 56. It will be understood that the pieces of tubing 24 accumulated in the storing means 43 during the replacement of the magazines 56 described above will not be reduced by the resumption of the feeding of the pieces of tubing 24 to the magazine 56. If, however, the feeding of the pieces of tubing 24 to the loading wheels 30 is interrupted, the accumulated pieces of tubing act as a reserve from which the pieces of tubing may be withdrawn by the endless chains 16 for delivery to the magazine 56.

It will be recognized by those skilled in the art that the objects of the present invention have been achieved by the provision of a packaging apparatus for automatically filling a container with large quantities of cylindrical or multi-sided articles at high rates of production thus eliminating the heretofore known manual packaging operation. Such automatic packaging apparatus is operable to accept a steady flow of articles without interruption of its operation, is simple in structure and operation, is low in cost and is inexpensive to maintain.

From a consideration of FIG. 8, it will be apparent to those skilled in the art that it may be desirable to employ, as an alternative embodiment, a magazine 56a which is adapted for use in the packaging of multi-sided articles, such as hexagonal rods or pieces 24a. In such an embodiment, the magazine 56a is provided with a rounded left-hand lower corner, as viewed in such figure, which prevents jamming of the rods or the like 24a in such corner and facilitates the rolling action of such rods 24a required for the formation of subsequent layers in such magazine 56a.

While in accordance with the patent statues one best known embodiment of the invention has been illustrated and described in detail it is to be particularly understood that the invention is not limited thereto or thereby.

I claim:

1. Apparatus for packaging elongated articles, comprising an article-supporting member provided with a corrugated surface for receiving the elongated articles from a source of supply with their longitudinal axes aligned in one direction, a container disposed above and along said article-supporting member and having an entrance to admit the elongated articles and the article-supporting member, said container being further adapted to amass the elongated articles therein and having an exit to permit the egress of the article-supporting member therefrom, said article-supporting member being in engagement with the mass of elongated articles within said container between said entrance and said exit, and means for causing relative movement between said container and said article-supporting member, the force exerted by succeeding elongated articles introduced into the container on the mass of elongated articles already within such container being effective to cause such mass of elongated articles to rise thereby filling the container, and the relative movement between the container and the article-supporting member and the engagement of said corrugated surface of the article-supporting member with the mass of elongated articles being operative to reciprocate such mass thereby maintaining the mass in a rolling fluid state, assisting in the filling of the container and keeping such mass of elongated articles within such container with their longitudinal axes aligned in said one direction.

2. Apparatus for packaging cylindrical articles, comprising a movable member provided with a corrugated surface for receiving the cylindrical articles from a source of supply with their longitudinal axes aligned in one direction, means connected to said movable member for moving the latter and such cylindrical articles carried thereby in a direction transverse to the longitudinal axes of said cylindrical articles, and a container disposed above said movable member and along its path of movement and having an entrance to admit said movable member and the cylindrical articles carried thereby, said container being further adapted to amass such cylindrical articles therein and having an exit to permit the egress of the movable member therefrom, said movable member being in engagement with the mass of cylindrical articles within said container between said entrance and said exit, the force exerted by succeeding cylindrical articles carried into the container by the movable member on the mass of cylindrical articles already within the container being operable to cause such mass of cylindrical articles to rise thus filling the container, and the movement of said movable member through said container and the engagement of said corrugated surface of said movable member with such mass of cylindrical articles being effective to reciprocate such mass of cylindrical articles thereby maintaining such mass in a rolling fluid state, assisting in the filling of the container and keeping such mass of cylindrical articles within such container with their longitudinal axes aligned in said one direction.

3. Apparatus for packaging cylindrical articles, comprising a movable endless member provided with a corrugated surface for receiving the cylindrical articles from a source of supply with their longitudinal axes aligned in one direction, means connected to said movable member for moving the latter and such cylindrical articles carried thereby in a direction transverse to the longitudinal axes of said cylindrical articles, and a container disposed above said movable endless member and along its path of movement and having an entrance adapted to admit said movable endless member and the cylindrical articles carried thereby, said container also having an exit adapted to permit the egress of the movable endless member therefrom while retaining such cylindrical articles in said container and a bottom portion inclined upwardly from the plane of movement of the movable endless member to permit the cylindrical articles to roll upwardly thereon from the movable endless member, said movable endless member being in engagement with the mass of cylindrical articles within said container between said entrance and said exit, the force exerted by succeeding cylindrical articles carried into the container by the movable endless member on the mass of cylindrical articles already within the container being operable to cause such mass of cylindrical articles to rise thus filling the container, and the movement of said movable endless member through said container and the engagement of said corrugated surface of said movable endless member with such mass of cylindrical articles being effective to reciprocate such mass of cylindrical articles thereby maintaining such mass in a rolling fluid state, assisting in the filling of the container and keeping such mass of cylindrical articles within such container with their longitudinal axes aligned in said one direction.

4. Apparatus for packaging multi-sided articles, comprising a movable endless member provided with a corrugated surface for receiving the multi-sided articles from a source of supply with their longitudinal axes aligned in one direction, means connected to said movable member for moving the latter and such multi-sided articles carried thereby in a direction transverse to the longitudinal axes of said multi-sided articles, and a container disposed above said movable endless member and along its path of movement and having an entrance adapted to admit said movable endless member and the multi-sided articles carried thereby, said container also having an exit adapted to permit the egress of the movable endless member therefrom while retaining such multi-sided articles in said container and an arcuate bottom portion to prevent jamming of the multi-sided articles adjacent such exit, said movable endless member being in engagement with the mass of multi-sided articles within said container between said entrance and said exit, the force exerted by succeeding multi-sided articles carried into the container by the movable endless member on the mass of multi-sided articles already within the container being operable to cause such mass of multi-sided articles to rise thus filling the container, and the movement of said movable endless member through said container and the engagement of said corrugated surface of said movable endless member with such mass of multi-sided articles being effective to reciprocate such mass of multi-sided articles thereby maintaining such mass in a rolling fluid state, assisting in the filling of the container and keeping such mass of multi-sided articles within such container with their longitudinal axes aligned in said one direction.

5. Apparatus for packaging cylindrical articles, comprising endless chains having registering grooves disposed between raised hub portions of the individual links, which grooves are adapted to receive the cylindrical articles from a source of supply with their longitudinal axes aligned in one direction, said endless chains being operable to move such cylindrical articles in a direction transverse to their longitudinal axes and a container disposed above said endless chains and along its path of movement and adapted to admit said endless chains and the cylindrical articles carried thereby, said container being further adapted to amass such cylindrical articles therein while permitting the egress of the endless chains therefrom, the force exerted by succeeding cylindrical articles carried into the container by the endless chains on the mass of cylindrical articles already within the container being operable to cause such mass of cylindrical articles to rise thus filling the container, and the movement of said endless chains through said container and the alternate engagement of the raised hub portions and grooves on said endless chains with such mass of cylindrical articles being effective to reciprocate such mass of cylindrical articles thereby maintaining such mass in a rolling fluid state, assisting in the filling of the container and keeping such mass of cylindrical articles within such container with their longitudinal axes aligned in said one direction.

6. Apparatus for packaging cylindrical articles, comprising endless chains having registering grooves disposed between raised hub portions of the individual links, which grooves are adapted to receive the cylindrical articles from a source of supply with their longitudinal axes aligned in one direction, said endless chains being operable to move such cylindrical articles in a direction transverse to their longitudinal axes and a container disposed above said endless chains and along its path of movement and having an entrance adapted to admit said endless chains and the cylindrical articles carried thereby, said entrance coacting with said raised hub portions to prevent the cylindrical articles from backing-out therefrom, said container also having an exit adapted to permit the egress of the endless chains therefrom while retaining such cylindrical articles in said container, the force exerted by succeeding cylindrical articles carried into the container by the endless chains on the mass of cylindrical articles already within the container being operable to cause such mass of cylindrical articles to rise thus filling the container, and the movement of said endless chains through said container and the alternate engagement of the raised hub portions and grooves on said endless chains with such mass of cylindrical articles being effective to reciprocate such mass of cylindrical articles thereby maintaining such mass in a rolling fluid state, assisting in the filling of the container and keeping such mass of cylindrical articles within such container with their longitudinal axes aligned in said one direction.

7. Apparatus for packaging cylindrical articles, comprising a movable member adapted to receive the cylindrical articles from a source of supply with their longitudinal axes aligned in one direction and operable to move such cylindrical articles in a direction transverse to their longitudinal axes, a storing means disposed above said movable member and along its path of movement and adapted to admit said movable member and the cylindrical articles carried thereby, said storing means being further adapted to normally permit the egress of the movable member and the cylindrical articles carried thereby, a container disposed above said movable member and along its further path of movement and adapted to admit said movable member and the cylindrical articles carried thereby, said container being further adapted to retain such cylindrical articles therein while permitting the egress of the movable member therefrom, the force exerted by succeeding cylindrical articles carried into the container by the movable member on the mass of cylindrical articles already within the container being operable to cause such mass of cylindrical articles to rise thus filling the container, the movement of said movable member through said container and the engagement of said movable member with such mass of cylindrical articles being effective to reciprocate such mass of cylindrical articles thereby maintaining such mass in a rolling fluid state, assisting in the filling of the container and keeping such mass of cylindrical articles within such container with their longitudinal axes aligned in said one direction, operating means on said storing means operable to retain such cylindrical articles within said storing means while permitting the egress of the movable member therefrom, and control means on said container and operatively connected to said operating means, said control means being operable when said container is filled with cylindrical articles to actuate said operating means, thereby interrupting the flow of cylindrical articles to said filled container to permit the removal of such filled container while permitting the continued uninterrupted operation of said apparatus.

8. Apparatus for packaging cylindrical articles, comprising a movable member adapted to receive the cylindrical articles from a source of supply with their longitudinal axes aligned in one direction and operable to move such cylindrical articles in a direction transverse to their longitudinal axes, a storing means disposed above said movable member and along its path of movement and adapted to admit said movable member and the cylindrical articles carried thereby, said storing means being further adapted to normally permit the egress of the movable member and the cylindrical articles carried thereby, a container disposed above said movable member and along its further path of movement and adapted to admit said movable member and the cylindrical articles carried thereby, said container being further adapted to amass such cylindrical articles therein while permitting the egress of the movable member therefrom, the force exerted by succeeding cylindrical articles carried into the container by the movable member on the mass of cylindrical articles already within the container being operable to cause such mass of cylindrical articles to rise thus filling the container, and the movement of said movable member through said container and the engagement of said movable member with such mass of cylindrical articles being effective to reciprocate such mass of cylindrical articles thereby maintaining such mass in a rolling fluid state, assisting in the filling of the container and keeping such mass of cylindrical articles within such container with their longitudinal axes aligned in said one direction, operating means on said storing means operable to retain such cylindrical articles within said storing means while permitting the egress of the movable member therefrom, an operating circuit including circuit-closing means on said container and means for driving said operating means, and a control member on said container adjacent said circuit-closing means and engageable by said rising mass of cylindrical articles, said control member being operable when said container is filled with cylindrical articles to engage said circuit-closing means and cause closure of the operating circuit with resultant energization of said drive means thereby causing said operating means to interrupt the flow of cylindrical articles to said filled container to permit the removal of such filled container while permitting the continued uninterrupted operation of said apparatus.

9. Apparatus for packaging cylindrical articles, comprising a movable member adapted to receive the cylindrical articles from a source of supply with their longitudinal axes aligned in one direction and operable to move such cylindrical articles in a direction transverse to their longitudinal axes, a storing means disposed above said movable member and along its path of movement and having an entrance adapted to admit said movable member and the cylindrical articles carried thereby, said storing means also having an exit adapted to normally permit the egress of the movable member and the cylindrical articles carried thereby, a container disposed above said movable member and along its further path of movement and adapted to admit said movable member and the cylindrical articles carried thereby, said container being further adapted to amass such cylindrical articles therein while permitting the egress of the movable member therefrom, the force exerted by succeeding cylindrical articles carried into the container by the movable member on the mass of cylindrical articles already within the container being operable to cause such mass of cylindrical articles to rise thus filling the container, the movement of said movable member through said container and the engagement of said movable member with such mass of cylindrical articles being effective to reciprocate such mass of cylindrical articles thereby maintaining such mass in a rolling fluid state, assisting in the filling of the container and keeping such mass of cylindrical articles within such container with their longitudinal axes aligned in said one direction, an operating member reciprocable in said storing means adajacent said exit and operable to retain such cylindrical articles within said storing means while permitting the egress of the movable member therefrom, an operating circuit including circuit-closing means on said container and drive means connected to said operating member for causing reciprocation of the latter, and a control member on said container adjacent said circuit-closing means and engageable by the rising mass of cylindrical articles, said control member being operable when said container is filled with cylindrical articles to engage said circuit-closing means and cause closure of the operating circuit with resultant energization of the drive means thereby moving said operating member into said storing means and interrupting the flow of cylindrical articles to said filled container to permit the removal of such filled container while permitting the continued uninterrupted operation of said apparatus.

10. Apparatus for packaging pieces of tubing comprising endless chains having registering grooves disposed between raised hub portions of the individual links, which grooves are adapted to receive the pieces of tubing from a source of supply with their longitudinal axes aligned in one direction, said endless chains being operable to move such cylindrical articles in a direction transverse to their longitudinal axes, a storing means disposed above said endless chains and along their path of movement and having an entrance adapted to admit said endless chains and the pieces of tubing carried thereby, said storing means also having an exit adapted to normally permit the egress of the endless chains and the pieces of tubing carried thereby, a magazine disposed above said endless chains and along their further path of movement and having an entrance adapted to admit said endless chains and the pieces of tubing carried thereby, said magazine also having an exit adapted to permit the egress of the endless chains therefrom while retaining such pieces of tubing in such magazine and a bottom portion inclined upwardly from the plane of movement of the endless chains to permit the pieces of tubing to roll upwardly thereon from the endless chains, the force exerted by succeeding pieces of tubing carried into the magazine by the endless chains on the mass of pieces of tubing already within the magazine being operable to cause such mass of pieces of tubing to rise thus filling the magazine, the movement of said endless chains through said magazine and the engagement of said endless chains with such mass of pieces of tubing being effective to reciprocate such mass of pieces of tubing thereby maintaining such mass in a rolling fluid state, assisting in the filling of the magazine and keeping such mass of pieces of tubing within such magazine with their longitudinal axes aligned in said one direction, an operating member reciprocable in said storing means adjacent the exit thereto and operable to retain such pieces of tubing within said storing means while permitting the egress of the endless chains therefrom, an operating circuit including circuit-closing means on said magazine and drive means connected to said operating member for causing reciprocation of the endless chains, and a control member on said magazine adjacent said circuit-closing means and engageable by the rising mass of pieces of tubing, said control member being operable when said magazine is filled with pieces of tubing to engage said circuit-closing means and cause closure of the operating circuit with resultant energization of the drive means thereby moving said operating member into said storing means and interrupting the flow of pieces of tubing to said filled magazine to permit the removal of such filled magazine while permitting the continued uninterrupted operation of said apparatus.

References Cited in the file of this patent

UNITED STATES PATENTS

| 359,635 | Sawyer | Mar. 22, 1887 |
| 1,122,641 | Smith et al. | Dec. 29, 1914 |
| 2,386,545 | Drobish | Oct. 9, 1945 |

FOREIGN PATENTS

| 540,734 | Italy | Mar. 13, 1956 |